United States Patent [19]
Macken

[11] Patent Number: 4,469,931
[45] Date of Patent: Sep. 4, 1984

[54] LASER ASSISTED SAW DEVICE

[76] Inventor: John A. Macken, 4039 Shadow Hill Dr., Santa Rosa, Calif. 95404

[21] Appl. No.: 417,511

[22] Filed: Sep. 13, 1982

[51] Int. Cl.³ .............................................. B23K 27/00
[52] U.S. Cl. ...................... 219/121 LG; 219/121 LN; 219/121 FS; 219/121 LH; 219/121 LJ
[58] Field of Search ................. 219/121 LG, 121 LN, 219/121 LH, 121 LJ, 121 LP, 121 LQ, 121 LR, 121 LT, 121 FS; 83/862–865, 425, 431, 437, 701

[56] References Cited

U.S. PATENT DOCUMENTS 3,679,863  7/1972  Houldcroft et al. ......... 219/121 LN
4,058,150  11/1977 Pennington ....................... 83/862 X
4,084,988  4/1978  Engel et al. .............. 219/121 LT X

FOREIGN PATENT DOCUMENTS 53-73692  1/1978  Japan ............................ 219/121 LT

OTHER PUBLICATIONS

M. A. Grimm, IBM Technical Disclosure Bulletin, "Optical System for Laser Machining of Narrow Slots", vol. 14, No. 9, Feb. 1972, pp. 2641–2642.

Primary Examiner—C. L. Albritton
Attorney, Agent, or Firm—Edward E. Roberts

[57] ABSTRACT

A method and apparatus for eliminating chipping at the exit surface of a saw blade through material such as wood or the like, the apparatus including a laser source emitting a laser beam which is focused to provide one or more grooves at the surface of the wood in general alignment with the line of cut in advance thereof. In a first embodiment a single groove is formed by a focused laser beam at a spot just ahead of the saw blade which may be positioned for one edge of the teeth thereof cutting through the center of the groove to produce one finished cut edge. In the other embodiments, two focused beams are created from a single beam for producing parallel grooves at a width approximating the width of cut of the saw blade to produce finished edges on both sides of the saw cut.

14 Claims, 6 Drawing Figures

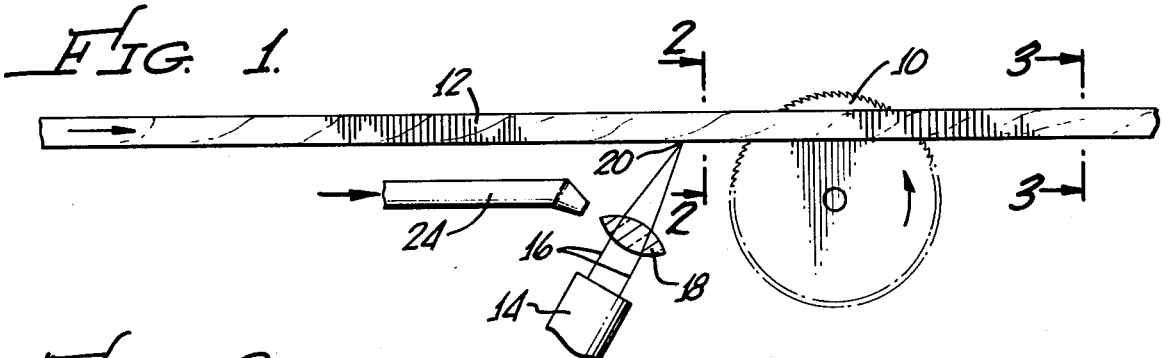
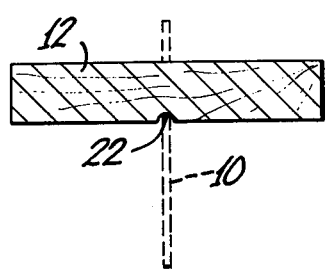
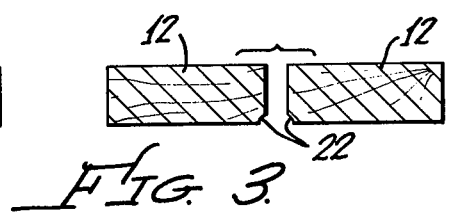
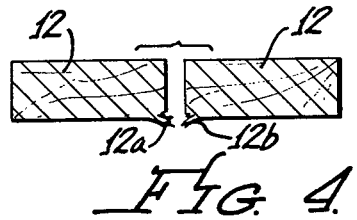
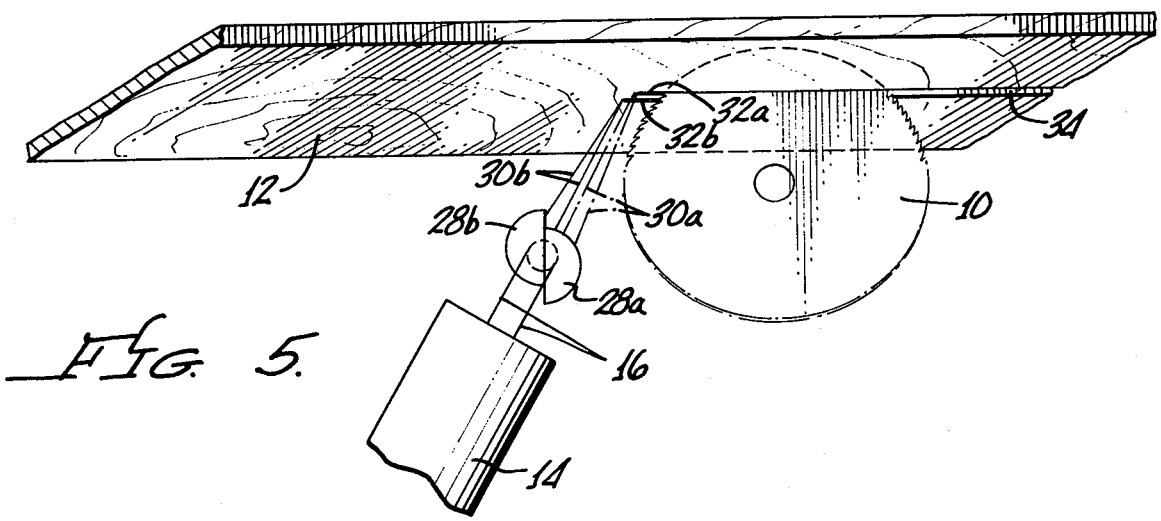
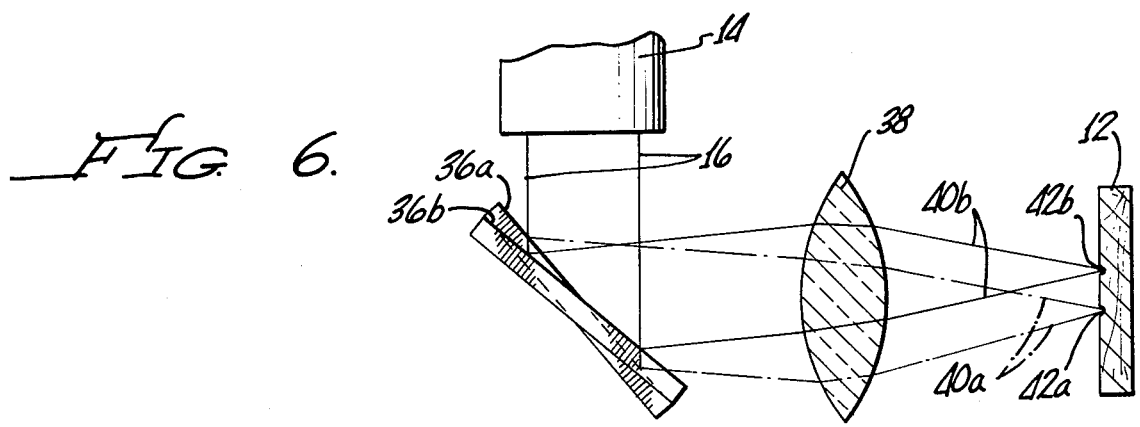

LASER ASSISTED SAW DEVICE

BACKGROUND OF THE INVENTION

The background of the invention will be discussed in two parts:

1. Field of the Invention

This invention relates to laser apparatus and more particularly to a method and apparatus for using laser assistance with conventional saw devices for producing a chip free cut.

2. Description of the Prior Art

In conventional apparatus for cutting materials such as wood, plastics and the like, normally a saw blade is utilized with relative movement between the wood and the blade being effected to provide the cutting of the wood. In such cutting operations, at the point of exit of the saw blade from the surface of the wood, chipping, or "chip-out" is often encountered. In some cutting operations, such as cutting of plywood, this "chip-out" is more in the nature of "splintering", the chipping or splintering being more pronounced as the speed of cut is increased.

Although laser apparatus has the ability to cut wood, or similar materials, the use of a laser for lumber cutting operations is economically disadvantageous, at present, due to the high cost of lasers compared to the equivalent production capacity of saws. In addition, such wood cutting industries have already invested vast amounts of capital in conventional saw apparatus.

Depending on the ultimate use of the cut wood, if a finished edge is desired, an additional operation is required on the chipped edge to provide a "chip-free" finish, thus adding cost to the lumber product.

It is an object of the present invention to provide a new and improved method and apparatus for cutting wood or similar materials.

It is another object of the present invention to provide a new and improved method and apparatus for using laser apparatus in providing a chip free edge during conventional saw cutting.

SUMMARY OF THE INVENTION

The foregoing and other objects of the invention are accomplished by providing a laser apparatus having the beam thereof focused to provide one or more partial cuts in the wood in advance of the saw blade. The laser beam is carefully positioned relative to the edge of the saw blade and the laser cuts are usually made on the side of the board where the sawteeth exit. In a first embodiment, a single laser beam of appropriate power and focus spot size cuts a single appropriately positioned groove in advance of the saw blade. In the second embodiment the laser beam is split and focused on the board, thus producing two parallel partial cuts by use of the laser beams, the distance between the cuts being approximately equal to the width of the saw blade. The position of the cuts is such that each edge of the saw blade exits the board in one of the two parallel laser-cut grooves. Means may be provided for eliminating sawdust buildup on the optical parts, such means taking the form of an air stream providing device or a conical shroud around the optical parts.

Other objects, features and advantages of the invention will become apparent from a reading of the specification when taken in conjunction with the drawings, in which like reference numerals refer to like elements in the several views.

BRIEF DESCRIPTION OF THE DRAWINGS

FIG. 1 is a partially diagrammatic side elevational view of the laser assisted wood cutting apparatus according to the invention;

FIG. 2 is a cross-sectional view of the wood shown in FIG. 1 taken along line 2—2 thereof, with the saw blade position depicted in dotted lines;

FIG. 3 is a cross-sectional view of the wood after the cutting operation as viewed generally along line 3—3 of FIG. 1;

FIG. 4 is a cross-sectional view of a piece of wood similar to FIG. 3 showing the chipping effected when the laser apparatus is not used;

FIG. 5 is a partially diagrammatic perspective view of the underside of a piece of wood being cut utilizing an alternative embodiment of laser apparatus; and FIG. 6 is a diagrammatic side elevational view of another laser apparatus for accomplishing the same result as the apparatus of FIG. 5.

DESCRIPTION OF THE PREFERRED EMBODIMENT

Referring now to the drawings, and particularly to FIG. 1, there is shown a conventional saw blade 10, commonly referred to as a circular saw, positioned and adapted for cutting a piece of material such as the length of wood 12. In such apparatus, normally the saw blade 10 is in a fixed location, such as beneath and extending through a saw table (not shown). The wood 12 is then passed over the surface of the table to be suitably cut by the blade 10, as a rip cut or a cross-cut. In normal use of conventional apparatus, the saw blade 10 will be rotating in the direction shown by the arrow thereon, that is counterclockwise as viewed in FIG. 1 and the wood 12 will be fed into the blade 10 from left to right as viewed in FIG. 1 in the direction of the arrow thereon. Since materials such as wood are generally non-homogeneous, the amount of "chip-out", or splintering or chipping will vary in accordance with the non-homogeneous nature of the material, will vary in accordance with the feed rate, and will likewise vary in accordance with the number of teeth per inch in the blade as well as the direction of the cut, that is cross-cut versus ripping. Generally, the worst chipping occurs in plywood when it is being cross-cut.

In accordance with the present invention, to minimize or eliminate the frayed, chipped or splintered cut edge, the wood 12 is partially cut by a focused laser beam along the path of one edge of the saw blade. The chip-out protected edge of the saw cut should exit the board within the lower cut groove, the optimum width and depth of the laser cut being controlled by a number of factors. As shown in FIG. 1 a laser source 14 is provided beneath the wood 12 for emitting a laser beam 16 which is suitably acted upon by optical means such as a lens 18 for providing a focused spot 20 on the undersurface of the board or wood 12. This focused spot 20 of laser energy impacting on the undersurface of the wood 12 "pre-cuts" the wood 12 to a given depth with a given width in general alignment with, and in advance of, the point of cut of the saw blade 12 (see also FIG. 2). As shown in FIG. 2, the result is a groove 22 formed on the undersurface of the wood 12 in general alignment with, and in advance of the cut of the saw blade 10. For materials, such as wood, the laser beam 16 focused to a power density in excess of 20,000 watts/cm² will achieve clean vaporization of the wood at the point of impact of the beam with the surface. If the laser beam 16 is focused to this power density and scanned across the surface of a piece of wood, a clean cut or groove is produced, the width of which is equal to the diameter of the focused laser beam at the point of impingement. The depth of the cut or groove 22 is dependent on four factors, these being the power of the laser beam 16, the diameter of the focused laser beam at the point 20, the scan speed (that is, the speed of movement of the wood 12 relative to the spot 20) and the density of the wood 12. The most desirable depth is determined by experimentation and is usually the minimum depth which prevents chip-out for the particular material and saw.

On a volumetric basis, is generally requires a certain amount of laser energy to vaporize a certain volume of wood of a given density. For example, it takes approximately 3,000 watt-seconds of focused laser energy to vaporize a cubic centimeter of wood of medium density, such as walnut or oak.

FIGS. 2 and 3 illustrate in cross section the effect of the groove 22 in advance of the saw cut (FIG. 2) and after the saw cut (FIG. 3). FIG. 2 is a cross section of the board 12 of FIG. 1 taken along line 2—2 thereof, the board being viewed end-on, and showing shallow cut 22 as produced by the focused laser beam. FIG. 3 is another cross-sectional view of board 12 but taken along line 3—3 thereof and showing the board after the saw has made its cut. Also shown is the swath removed by the saw, and the laser cut 22. Ideally the edge of the saw blade will exit near the center of the laser cut. As can be seen there is no chip-out at the edge of laser cut 22. In contrast to this, as shown in FIG. 4, a cut through a piece of wood 12 without the use of the pre-grooving will result in frayed or splintered edges 12a and 12b on the side of the wood through which the blade 10 exits.

Ideally, the width of the laser cut groove remaining after the saw cut is made is no more than three times as wide as the depth of the laser cut groove.

As shown in FIG. 1, the laser source 14 and the lens 18 are positioned beneath the wood 12, as a consequence of which sawdust emanating from the cutting by the blade 12 would be directed at the lens 18 and laser source 14. To guard against accumulation of sawdust on the operative elements, a suitable source of air may be directed through the nozzle 24 to deflect the sawdust away from lens 18 and laser source 14. Alternatively, a conical shroud may be provided around the lens 18, such shrouds being commercially available. These shrouds have a hole at the vertex of the cone where the laser beam and an air blast exit coaxially. Other methods of preventing sawdust from collecting on the lens 18 may be readily devised by those skilled in the art.

By way of example, with the apparatus of FIG. 1, utilizing plywood in a crosscut situation (this representing the worst case of chip-out occurrence in a conventional wood-cutting) a 200 watt carbon dioxide laser was utilized for the source 14. The laser beam 16 was focused through lens 18 to produce a groove 22 having a width of approximately 0.50 millimeter and a depth of 0.75 millimeter with a feed or scanning rate of 20 centimeters per second. For the purpose of producing only one chip free edge, the saw blade 10 was positioned relative to the groove 22 so that one edge of the saw blade 10 exited near the center of the laser cut groove 22. As a consequence this produced no chip-out at the edge of the laser cut groove 22.

In some cases it is necessary to have only one good edge on a saw cut and therefore only one small diameter focused laser beam would be required. However in some cases it is desirable to have both edges of the saw cut free of chip-out.

Since many saw blades used in high producion cut a swath 3.0 millimeters wide, or wider, it could be wasteful of laser power to make a laser beam cut wider than the saw blade swath. If desired this could be done whereby the saw blade would cut down the middle of the laser cut area. However, the preferred approach as discussed below is to make two parallel laser cuts spaced apart by approximately the width of the saw blade.

As an alternative, attention is directed to FIG. 5 in which the apparatus of the alternate embodiment is illustrated in inverse relation to the wood 12, that is the perspective view is looking up from the bottom. The laser source 14 emits a laser beam 16 which is intercepted by a split lens assembly including semicircular lenses 28a and 28b, which may be formed from a single lens cut in half. The semicircular lenses 28a and 28b are physically displaced relative to one another with the straight edges thereof in abutting relation, the line of intersection approximately bisecting the laser beam 16 emitted from the source 14. This single laser beam 16 is broken into two components 30a and 30b, each of which is a separate converging beam, each being focused at the surface of the wood 12.

In this manner, the two focused laser beams 30a and 30b form two parallel grooves 32a and 32b, respectively, with the spacing between the two grooves 32a and 32b being approximately equal to or greater than the width of the cut of the blade 10, the two grooves being positioned to minimize or eliminate the saw blade chip-out caused by the blade 10 having the teeth thereof exiting through the surface of the wood 12 when the board is moving in the direction of the arrow thereon. The cut 34 produced is relatively chip free along both edges thereof. With the apparatus as shown in FIG. 5, with the intersection of the two lenses 28a and 28b bisecting the beam 16, the two converging beams 30a and 30b should have approximately equal power for creating roughly identical grooves 32a and 32b, that is the same depth and width. Means may be provided for adjusting the relative positioning of the two lenses 28a and 28b, if desired, in order to control the width between the grooves 32a and 32b to accommodate varying widths of the cut 34 depending on the width of the blade 10 used. Such adjustment mechanisms are within the skill of those in the art.

FIG. 6 depicts another apparatus which may be employed to achieve parallel grooves similar to the apparatus of FIG. 5. In this apparatus, the laser source 14 emits a laser beam 16 which is intercepted by two flat mirrors 36a and 36b (shown in side view), the mirrors 36a and 36b being semicircular mirrors which are approximately touching along their straight edges but angularly displaced relative to one another. Each mirror 36a and 36b intercepts the laser beam 16 at a slightly different angle, thereby producing different angles of reflection. If the straight edges of the mirrors 36a and 36b approximately bisect the laser beam 16, then there is approximately equal power contained in each of the two reflected angles if laser beam 16 is symmetrical. These two reflected beams are then passed through lens 38 to form two separate converging beams 40a and 60b, respectively, which in turn are focused on the surface of the wood 12 to form two generally equal grooves 42a and 42b, respectively, in the wood 12 as it moves in a direction normal to the plane of the drawing. Although the blade 10 is not shown in FIG. 6, the blade would be positioned so that the outer cutting edges thereof were within the distance between the two grooves 42a and 42b, with these outer cutting edges exiting through the appropriate groove 42a or 42b.

A variation on FIG. 6 would be to have mirrors 36a and 36b properly concave curved so that light reflecting off these mirrors would focus at 42a and 42b respectively, when lens 38 is removed. Those skilled in the art will recognize the optical equivalency of using curved reflectors 42a and 42b in FIG. 6, each tipped at a slightly different angle, and the use of lens segments 28a and 28b in FIG. 5, each with its optical axis slightly displaced. Furthermore, although not shown it is to be understood that adjustment mechanisms may be conveniently provided for varying the width of the groove 22 in the embodiment of FIG. 1 as well as adjusting the distance between grooves in the alternate embodiments of FIGS. 5 and 6.

As previously mentioned, using a relatively economical 200 watt carbon dioxide laser in conjunction with conventional saw apparatus, substantial production speeds of 20 centimeters per second are obtainable while producing relatively chip or splinter free edges at the cut. By way of comparison only, if the laser were to be utilized as the sole cutting source (that is a 200 watt carbon dioxide laser) to cut through a two centimeter thick piece of plywood, the cutting speed would be approximately forty times slower that is, cutting speed would be reduced to 1/20 of a centimeter per second. Alternatively, to achieve the same production speed with just a laser cutting device in inordinate amount of laser energy would be required making such usage with current laser technology uneconomical. In contrast, in accordance with the present apparatus and method, the economy of the saw blade 10 combined with the efficient non-physical contact of the laser beam 16 utilizes the best of both to provide a relatively splinter or chip free cut edge on one or both sides of the cut, as desired, depending on the positioning of the groove relative to the position of the cut.

It should also be understood that while the discussion has centered on using the laser cut to prevent chip-out on the side of the material where the saw blade exits, in some applications, it may also be desirable to have another laser cut on the side of the material where the saw blade enters.

While there have been shown and described preferred embodiments, it is to be understood that various other adaptations and modifications may be made within the spirit and scope of the invention.

I claim:

1. In a method for producing a relatively chip-free cut edge in a group of materials consisting of wood and plastic cut by a saw blade, the method comprising:
   providing a laser beam;
   focusing the laser beam on the surface of the wood to sufficient power density to vaporize the wood; and
   translating the focused laser spot relative to the wood to cut a groove on the side of the wood wherein chip-out prevention is desired and in advance of the saw blade cut.

2. The method of claim 1 wherein the width of the laser cut groove remaining after the saw cut is made is no more than three times as wide as the depth of the laser cut groove.

3. The method of claim 1 wherein the step of focusing the laser beam includes splitting a single laser beam and focusing the component parts to form two grooves.

4. The method of claim 1 wherein the laser cut groove and the saw blade cut are relatively positioned such that the saw blade cuts away part of the laser cut groove.

5. The method of claim 4 wherein the chip-out protected edge of the saw cut is within the laser cut groove.

6. In an apparatus for use in conjunction with a saw blade for providing a generally chip-free cut edge in a group of material consisting of wood and plastic, the combination comprising:
   a source of laser energy for providing a laser beam; and
   means for focusing the laser beam to a spot at the surface of the piece of wood for cutting a groove of a predetermined width and of a predetermined depth as the wood is moved relative to the focused spot, said focused spot being in general alignment with the line of the saw cut for producing a generally chip-free cut edge.

7. The combination according to claim 6 wherein said means for focusing includes lens means.

8. The combination according to claim 6 wherein said means for focusing includes mirror means.

9. The combination according to claim 6 wherein said means for focusing includes means for splitting a single laser beam into two component parts, each of which is focused at the surface for producing two parallel grooves at a spacing approximately equal to the width of the cut of the saw blade.

10. The combination according to claim 9 wherein the means for focusing includes a pair of semi-circular lenses having the straight edges thereof in proximate relation generally bisecting the laser beam, with each lens displaced relative to the other for providing two converging focused beams at the surface.

11. The combination according to claim 9 wherein the means for focusing includes a pair of semi-circular mirrors having the straight edges thereof in proximate relation generally bisecting the laser beam, with each mirror displaced relative to the other for splitting the beam, and further includes lens means for focusing the two beam portions at the surface of the wood.

12. In a method for producing a relatively chip-free edge in a material such as wood or plastic, said method comprising:
   laser cutting at least one groove in a surface of the material, said groove having a predetermined depth and width along the intended line of cut; and
   passing a saw blade through said material with the teeth thereof exiting through the side with said groove with at least one edge of the teeth passing through the groove for providing a generally chip-free cut edge adjacent thereto.

13. The method of claim 12 wherein said laser cutting step includes laser cutting of two parallel grooves, and the step of passing a saw blade through said material includes positioning the blade with opposite edges of the teeth of the blade passing through the grooves so-formed for providing two generally chip-free cut edges in the material.

14. The method of claim 13 wherein the width of said parallel grooves approximates the width of cut of the saw blade to thereby produce finished edges on both sides of the saw cut.

* * * * *